United States Patent [19]

Adams

[11] 4,180,623

[45] Dec. 25, 1979

[54] ELECTRICALLY RECHARGEABLE BATTERY

[75] Inventor: George B. Adams, Cupertino, Calif.

[73] Assignee: Lockheed Missiles & Space Company, Inc., Sunnyvale, Calif.

[21] Appl. No.: 928,785

[22] Filed: Jul. 28, 1978

Related U.S. Application Data

[63] Continuation-in-part of Ser. No. 861,535, Dec. 19, 1977, abandoned.

[51] Int. Cl.² .............................................. H01M 8/18
[52] U.S. Cl. ...................................... 429/21; 429/70; 429/107; 429/229
[58] Field of Search ...................... 429/21, 67, 70, 107, 429/206, 207, 210, 229–231, 247

[56] References Cited

U.S. PATENT DOCUMENTS

| | | | |
|---|---|---|---|
| 3,505,113 | 4/1970 | Merten et al. | 429/229 X |
| 3,905,833 | 9/1975 | Louzos | 429/207 |
| 4,069,371 | 1/1978 | Zito | 429/21 |

Primary Examiner—Charles F. LeFevour
Attorney, Agent, or Firm—Richard H. Bryer

[57] ABSTRACT

An electrically rechargeable battery comprising an inert cathode, a zinc anode and an aqueous alkaline electrolyte, for example, NaOH, in which said anode and cathode are immersed. The alkaline electrolyte in the vicinity of the cathode contains an alkali metal ferricyanide salt, such as $K_3Fe(CN)_6$ or $Na_3Fe(CN)_6$. Optionally, a mechanical separator is utilized between the anode and cathode to prevent gross mixing of the saturated electrolyte at the cathode with the electrolyte in the vicinity of the anode. Preferably, the separator is of the ion exchange type. During electrical discharge, at the anode and cathode, the battery produces soluble reaction products which are transported in the electrolyte to respective external storage tanks which increase battery capacity. During the charge cycle, the reverse conditions occur.

11 Claims, 3 Drawing Figures

ELECTRICALLY RECHARGEABLE BATTERY

CROSS REFERENCE TO RELATED APPLICATION

This application is a continuation-in-part application of co-pending U.S. patent application Ser. No. 861,535 filed Dec. 19, 1977, now abandoned.

BACKGROUND OF THE INVENTION

There exists a critical need to provide very large capacity rechargeable battery systems to the electrical utilities. This need comes about because the Nation's electrical generating capacity is frequently insufficient to provide peak power requirements. Storage batteries of the type described in this invention can be charged during off-power periods or during the night and then utilized to supplement the peak power demands. This application of very large capacity batteries is referred to in the electrical utility industry as load leveling or peak shaving. Batteries for this type of application must provide energy storage capacity at an economical price so as to be able to compete with alternate storage or peak power systems. As examples, compressed air and pumped water are alternate approaches to satisfying the peaking energy demand. It is generally accepted that a battery system with preferred features will utilize inexpensive constructional materials, will have very long-term cycling capability, will be environmentally harmless, will be inherently safe and because of real estate costs, will have a minimal size. Of great importance is the turnaround energy conversion efficiency which, as is generally accepted, should be 70 percent or greater.

Certain efforts have already been made to develop systems which satisfy these requirements. The traditional lead-acid battery has been improved so as to be able to provide a minimum of 2500 cycles without deterioration. Even although these efforts have been partially successful, the cost figures of such batteries indicate that they will greatly exceed $30/kW-hr, which has been specified by the utility industry as the maximum allowable cost. Also, because of the nature of lead-acid batteries wherein the electrodes themselves are constantly being changed in composition over each charge-discharge cycle, it is difficult to accomplish very many cycles without some irreversible morphological change. To overcome this disadvantage, investigators have been developing a new type of battery referred to as a circulating electrolyte redox battery. In a redox battery the electrodes do not change in composition; they merely act as sites at which the electrochemical reduction and oxidation (redox) reactions of selected ions in solution can occur. Typical ion pairs may comprise titanium plus three ions and titanium plus four ions ($Ti^{3+}/Ti^{4+}$) on one side of the battery and on the other, iron plus two ions and iron plus three ions ($Fe^{2+}/Fe^{3+}$). In these redox cells, a corrosive acid supporting electrolyte is generally used, such as hydrochloric acid, and a separator which has ion selective properties is essential. The separator allows a common ion, such as the hydrogen ion, to transport the electrical charge from one side of the battery to the other while, at the same time, preventing the titanium ions and iron ions from mixing. If such mixing occurs, the cell becomes chemically short-circuited and the products of such mixing cannot be economically separated for reuse. Separators of the required degree of cationic discrimi- nations suitable for this application have not yet been developed.

The open circuit voltage of redox cells is generally quite low, usually less than 1 volt, and during discharge this voltage is degraded by polarization. This polarization or degradation of potential is characteristic of many electrochemical systems, but in the redox system it increases with time as the ratios of the ion concentrations on each side of the battery change during discharge or charge. Because of the corrosive electrolyte, need for an ion selective membrane, and high chemical costs, it is unlikely that a redox system will satisfy the economic or durability requirements of electric utilities. Characteristics of redox load leveling battery systems are described in two recent publications; see, L. H. Thaller, Proceedings of the Symposium on Load Leveling, V 77-4, p. 353; N. P. Yao and J. R. Selman, Eds., The Electrochemical Society, Inc., Princeton, N.J., 1977; and J. Giner, L. Swette and K. Cahill, "Screening of Redox Couples and Electrode Materials," Final Report, Contract NAS 3-19760, Sept. 1, 1976, CR 134705. In U.S. Pat. No. 3,553,017, sealed storage batteries based on selected pairs of redox couples are described. All of these couples require acidic electrolytes for proper functioning.

Another approach to development of load leveling batteries utilizes a zinc electrode as the negative electrode and a chlorine/chloride cell as the positive electrode. This system is illustratively described in U.S. Pat. Nos. 3,713,888; 3,935,024; 3,940,283; 3,954,502; and 4,001,036 and utilizes a circulating acid electrolyte. This zinc-chlorine system has several advantages: (1) mixing of the electrolyte adjacent to the electrodes does not degrade performance as happens with the aforementioned redox battery; (2) the voltage of the cell is quite high, i.e., 2.0 V; (3) the cell voltage does not change with state of charge or discharge because the chemical composition at the electrodes remains constant; and (4) relatively inexpensive reactants are utilized. Nevertheless, the system suffers from a number of disadvantages such as the corrosive nature of the acid electrolyte, self-corrosion of the zinc electrode in the acid electrolyte and generation of explosive hydrogen gas, polarization of the chlorine gas/chloride ion positive electrode, and the requirement for a refrigeration system to store the chlorine reactant as its hydrate in a low temperature aqueous solution.

SUMMARY OF THE INVENTION

Briefly, in accordance with the invention, it has been discovered that a hybrid redox secondary battery obviates the aforesaid difficulties associated with redox batteries and permits the obtaining of high operating cell voltage and higher theoretical energy density than most redox systems. This is accomplished by utilizing a circulating aqueous alkaline electrolyte to overcome the problems of hydrogen evolution and corrosion, a zinc negative electrode (anode) which takes advantage of the high energy capacity of zinc, and an inert cathode. The alkaline electrolyte in the vicinity of the cathode is saturated with an alkali metal ferricyanide salt. Optionally, a mechanical membrane separator is utilized between the anode and cathode to prevent gross mixing of the anolyte and catholyte, although intermixing of anolyte and catholyte is permissible without a resultant severe loss in cell voltage. Preferably, the separator is of the ion exchange type. The circulating electrolyte lowers electrode polarization at both the anode and cathode, thereby increasing cell operating voltage at any given current density.

More particularly, during electrical discharge the battery produces soluble reaction products at the anode and cathode which are transported in the circulated electrolyte as saturated solutions to respective storage tanks located externally to the battery where the product solids, zinc oxide and an alkali metal ferrocyanide salt, are caused to crystallize out for storage by maintaining a small temperature differential between the battery and the storage tanks. Normally, the battery will be at a higher temperature than the storage tanks because of resistive heating during charge and discharge. Product salts will then crystallize out of the system at the point of lowest temperature, namely, the storage tanks. At the anode during discharge, zinc is anodically stripped from each anode surface and converted to a soluble alkali metal zincate, for example, sodium zincate, and stored as zinc oxide which precipitates from the zincate-saturated electrolyte in the respective storage tank. At the cathode during discharge, the alkali metal ferricyanide is converted to the corresponding alkali metal ferrocyanide which is stored (as a solid) externally to the battery.

During charge of the battery, the reverse conditions occur. Solid zinc oxide in the storage tank is continuously dissolved in the circulating alkaline electrolyte as a soluble alkali metal zincate and circulated to the anode, where zinc metal is removed from the electrolyte and electrodeposited on the anodes during charge. Solid alkali metal ferrocyanide salt in the second storage tank is dissolved in the circulating electrolyte and transported to the cathode, where it is electrochemically oxidized to the corresponding soluble ferricyanide, which then deposits in the storage tank as a solid salt from its saturated solution. The net result of the charging process is to convert the solid alkali metal ferrocyanide salt to the corresponding solid ferricyanide salt in the respective storage tank.

Although the use of external storage tanks is a preferred embodiment of the invention, it is readily apparent to one skilled in the art that the battery of the invention is not so limited. The function of the storage tanks is simply to store additional amounts of reactants and products, thereby increasing the battery capacity. The battery can be operated independently of storage tanks if desired by simply recycling the anolyte and catholyte streams, which exit from the exhaust ports of the electrolyte manifolding system, back to the respective anolyte and catholyte entry ports in the battery.

It has been discovered that a number of unexpected advantages accrue from utilizing the system and the electrochemical couple of the invention. Although the potential of the zinc/ferro-ferricyanide couple of the invention can be theoretically deduced from standard tables, to applicant's knowledge such a couple has never been utilized by the art. The ferro-ferricyanide redox couple heretofore has been a scientific curiousity because it functions with virtually no chemical polarization. This and other kinetic aspects of this redox couple are described by A. A. Wragg, "Natural Convection at Planar Mesh Electrodes in the Ferro-Ferricyanide System," Journal of Applied Electrochemistry, No. 7, pp. 363–365 (1977) and J. C. Bazan and A. J. Ariva, "The Diffusion of Ferro and Ferricyanide Ions in Aqueous Solutions of Sodium Hydroxide," Electrochimica Acta, No. 10, pp. 1025–1032 (1965). Applicant has found, however, that the open circuit voltage of the zinc/ferro-ferricyanide couple is 1.86 V which is substantially greater than the voltage which would be calculated by one skilled in the art using accepted thermodynamic principles and data. The anticipated voltage of the couple is 1.58 V. The higher than expected value is due to the presence of the alkaline electrolyte. This discovery represents a unique advantage in a system where the higher the available voltage, the greater the amount of usable energy from the materials used in its construction.

As would be expected, if the zinc electrode contacts the ferricyanide ion, it will chemically reduce it to ferrocyanide. It has been unexpectedly found that if such contact occurs during operation of the cell, the zinc electrode's potential is not significantly degraded. Thus, unlike the redox battery, although contact of the electrolyte of the cathode (catholyte) with the anode causes a loss of energy storage capacity, it does not significantly degrade the electrochemical cell performance. If inadvertent contact of the catholyte and the anode occurs, an insoluble product is eventually formed which, according to an embodiment of the invention, may be recovered before the next cycle. By recovered is meant the ability to return the active material to its respective electrode compartment within the cell. Such recovery of active materials cannot occur in the prior art redox systems when anolyte and catholyte mix by interdiffusion through the separator.

The acidic electrolytes heretofore used in redox batteries preclude the use of such a ferro-ferricyanide couple since both ferrocyanide and ferricyanide salts are unstable in an acidic medium and decompose to toxic products. Furthermore, if this couple were used with zinc in an acidic electrolyte, zinc ferrocyanide would precipitate on the zinc anodes as an insoluble, passivating film which would effectively destroy the electrical output from the battery. However, this zinc salt is soluble in alkaline electrolytes and this problem is precluded by their use. There is no teaching in the art that such a couple, when combined with the zinc electrode of the invention, would exhibit unobvious chemical properties. The unique combination of this electrochemical couple with a zinc electrode results in an open circuit battery potential that is higher than thermodynamic theory would predict.

The hybrid battery of the invention has potentially long-cycle life because of complete removal of reaction products from electrode surfaces in soluble form during discharge by means of the circulating alkaline electrolyte. Also, the use of saturated solutions of cell reactants and products, formed by circulating the alkaline electrolyte over the equivalent stored solid salts, maintains charging and discharging potentials more nearly constant over the charge-discharge cycle than when reactant and product concentrations vary, as in the case of redox batteries in which reaction products are stored in dissolved form.

Another important feature of the hybrid redox battery is that ferro or ferricyanide ions which diffuse through the membrane separator into the zinc electrode compartment can be periodically recovered and returned to the positive electrode compartment, using a simple slurry transfer mechanism incorporated as an embodiment of this invention. Contrasted to this, in a redox battery, intermixing of anolyte and catholyte across the membrane separator is an irreversible process, which eventually causes total degradation of battery capacity and operational life.

It has been further determined that the battery of the invention will operate efficiently at any temperature from ambient up to 50° C. or more. This is a clear advantage over conventional zinc-chlorine systems requiring refrigeration.

Illustrative single cell operating characteristics are as follows for constant-current charging at 20 mA/cm$^2$ followed by constant-current discharge at 35 mA/cm$^2$. At 25° C., a cell discharge voltage of 1.4 V and charging voltage of 2 V are obtained with a cell containing a Nafion XR 475 membrane separator, a porous nickel cathode, and a silver-plated iron anode upon which zinc is electrodeposited. Better results were obtained at 38° C. when over 222 consecutive nominal three-hour charge-discharge cycles resulted in an average discharge voltage of 1.5 V and a charging voltage of 2.0 V. Voltage efficiencies of 75 percent were obtained and coulombic efficiencies (to a 250 mV cutoff) averaged 98 percent. Optimum cell design should result in a voltage efficiency of 91 percent.

BRIEF DESCRIPTION OF THE DRAWING

The invention may be more easily understood from the following description and accompanying drawing in which.

DESCRIPTION OF THE PREFERRED EMBODIMENTS

Figure 1:
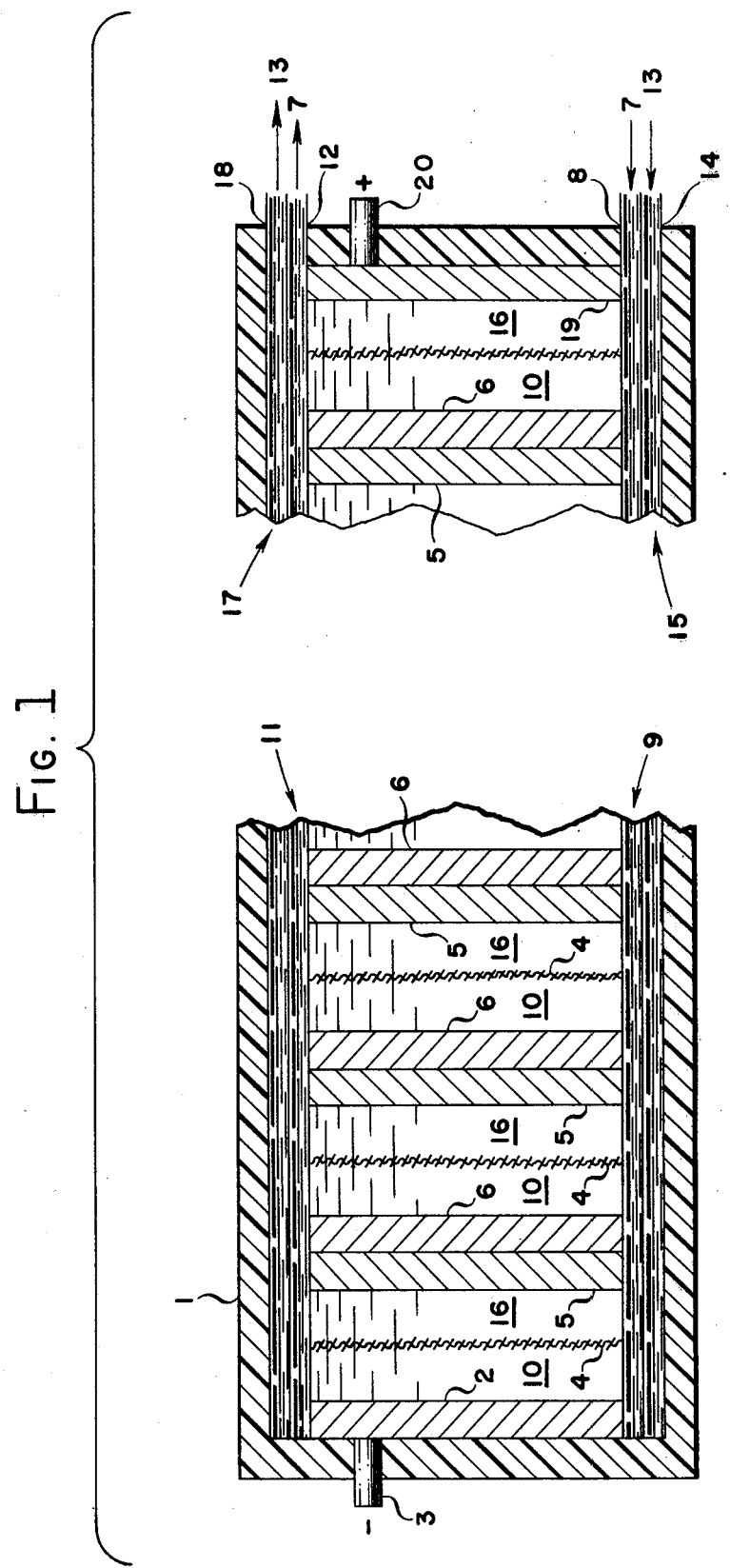
FIG. 1 is a schematic cross-sectional view of one embodiment of a secondary battery of the invention.

Referring more particularly to FIG. 1, where like reference characters designate corresponding parts, there is depicted one embodiment of a secondary battery of the invention composed of a plurality of bipolar electrodes connected in series internally. Battery case (1) contains the cell array, provides the ingress and egress chambers for distribution of the electrolyte, and provides the openings whereby electrical power is conducted outside the battery through terminals. End anode (2) which initiates the cell array is connected to terminal (3). A membrane separator (4) separates anode (2) from a bipolar electrode consisting of cathode (5) and anode (6) on the reverse side of cathode (5). An anodic reaction (electro oxidation of zinc to zincate ion) occurs at anode (2) and a reduction (electro reduction of ferricyanide ion to ferrocyanide ion) occurs at cathode (5) during battery discharge. Similar reactions occur at the other depicted bipolar electrodes of the battery. Anolyte (7), for example, an alkali metal zincate dissolved in an alkali metal hydroxide electrolyte, is pumped into the battery at an entry port (8), travels through an anolyte manifold (9), passes through outlet ports in the manifold into the respective anolyte compartments (10) and then discharges from each compartment (10) through exit ports into a common discharge manifold (11). The anolyte is discharged from the battery through outlet port (12). The anolyte (7) can be pumped into external storage tanks which enhance battery capacity or the battery can be operated independently of storage tanks, at lower capacity, by recycling the anolyte (7) to the entry port (8).

In similar fashion, catholyte (13) is pumped into the battery at an entry port (14), travels through a catholyte manifold (15), passes through outlet ports in the manifold into the respective catholyte compartments (16) and then discharges from each compartment (16) through exit ports into a common discharge manifold (17). The catholyte is discharged from the battery through outlet port (18). The catholyte (13) can be pumped into external storage tanks which enhance battery capacity or the battery can be operated independently of external storage tanks, at lower capacity, by recycling the catholyte (13) to the entry port (14). The bipolar cell array terminates with a cathode (19) which is attached to a terminal (20). The depicted bipolar design is preferred because of its compact packing. However, it is obvious to one skilled in the art that any cell configuration such as a multiplicity of monopolar cells or a combination of the two will satisfy the design requirements.

Figure 2:
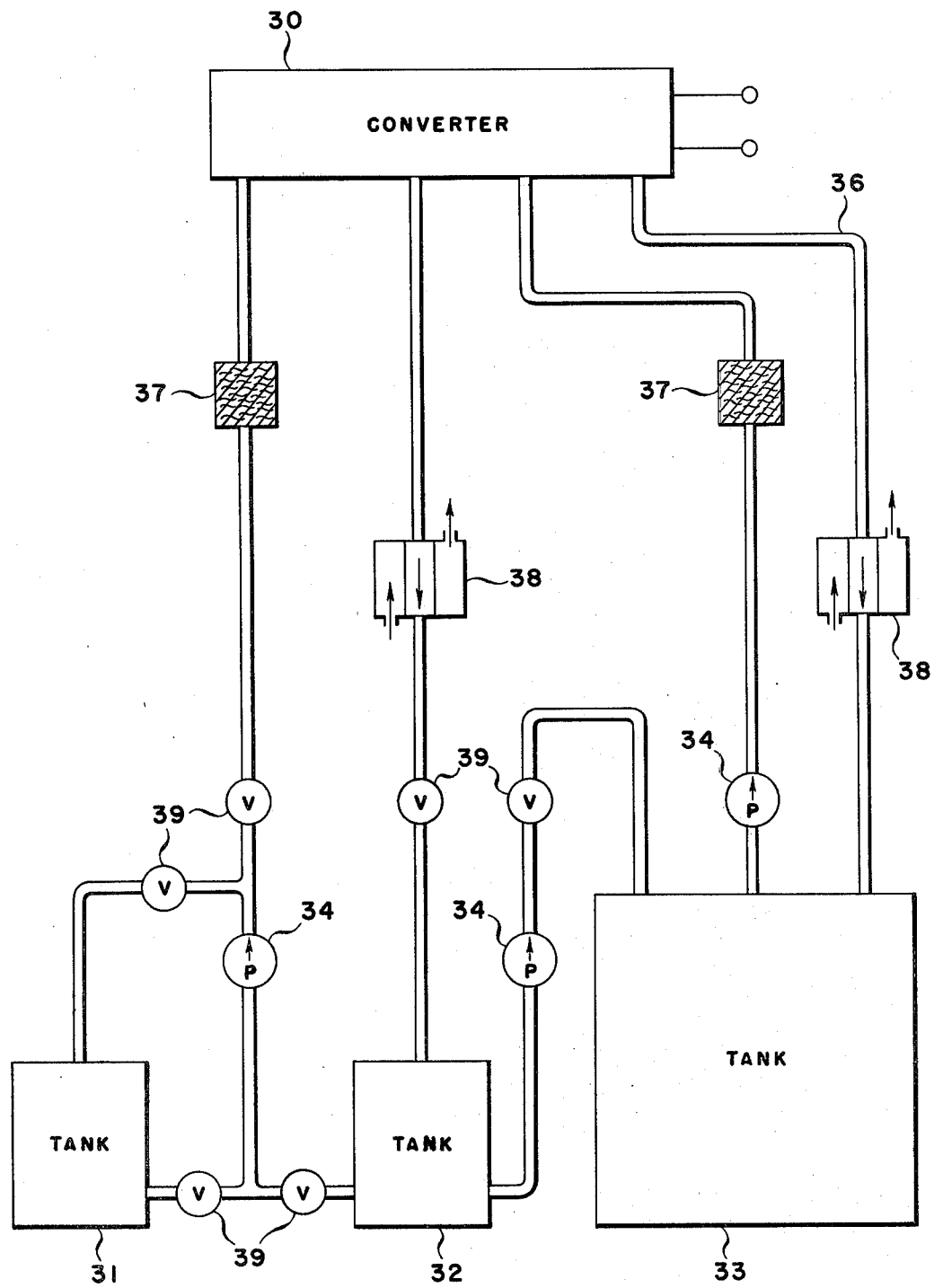
FIG. 2 is a schematic drawing of one embodiment of the rechargeable hybrid redox electrical energy storage system of the invention.

In FIG. 2 there is shown a schematic drawing of one embodiment of the rechargeable hybrid redox electrical energy storage system of the invention. The storage system comprises battery (30), shown in detail in FIG. 1, connected to storage tanks (31), (32), and (33) which store products and reactants produced and consumed in the battery. Pumps (34) circulate anolyte (35) and catholyte (36) between battery (30) and the storage tanks (31), (32), and (33). Filters (37) are used to maintain the electrolyte stream free from solids. Heat exchangers (38) remove heat from the battery (30), cooling the electrolytes sufficiently so that solid products crystallize out in the storage tanks (32) and (33). A system of valves (39) allows control of flow rates and also allows an alkali metal ferrocyanide, for example, Na$_4$Fe(CN)$_6$.10H$_2$O, which may accumulate in tank (32) due to diffusive loss across the membrane separators in the battery (30), shown in FIG. 1, to be returned to storage tank (33) for recirculation to the battery in the catholyte. This capability of recovering alkali metal ferrocyanide temporarily lost to the anolyte by diffusion through the membrane separator is an important embodiment of the invention.

In the charged state, metallic zinc is stored in battery (30) and alkali metal ferricyanide is stored externally as a solid in storage tank (33), for example, as Na$_3$Fe(CN)$_6$.H$_2$O. On discharge, zinc dissolves as the zincate ion and is stored in tank (32) as solid zinc oxide. Solid alkali metal ferricyanide in tank (33) is converted into the corresponding ferrocyanide salt, for example, Na$_4$Fe(CN)$_6$.10H$_2$O. The battery is operated at some temperature above ambient so that the reactant solids will crystallize out of the supersaturated solutions in the storage tanks at ambient temperature. This design configuration has two important advantages: It minimizes storage tank volume requirements and also maintains charge and discharge voltages more nearly constant over the complete charge and discharge cycles, since the ferrocyanide and ferricyanide ion concentrations are automatically maintained constant at the ambient temperature saturation values. Minimal amounts of electrolyte are circulated through the system.

After a prolonged period of operation, sufficient alkali metal ferrocyanide solid will accumulate in tank (32) to require recovery. This recovery is accomplished as follows. The cells of battery (30) would be charged fully to dissolve all zinc oxide solid in the anolyte. Tank (32) would then be drained of free electrolyte by pumping into tank (31). The crystalline ferrocyanide slurry would then be pumped back into tank (33). Tank (32) would be refilled with anolyte from tank (31) and the system would be ready for discharge. It is to be noted that the capacity of tank (33) is about 45 times that of tank (31) or tank (32). A mechanical stirrer could be incorporated in tank (32) to facilitate removal of the crystalline slurry. If necessary, liquor from tank (33) would be used to facilitate the transfer.

Among other advantages of the depicted system, the recycling concept permits the use of relatively low-cost membrane separator material with significant reduction in overall capital cost. Intermixing of reactants does not cause irreversible voltage degradation and zinc lost from the electrode by mechanical dislodgement, which normally would be an irretrievable loss, will be slowly redissolved by reaction with ferricyanide ions diffusing in from the catholyte compartment and reenters the system as zincate ion. It has been found that because of the non-corrosive and chemically inert properties of the anolyte, tanks (31) and (32) and their associated plumbing hardware including pumps, valves, heat exchangers, and the like may be fabricated from inexpensive and abundant mild steel.

The catholyte, because of its content of ferricyanide, which will react slowly with mild steel and become reduced to the ferrocyanide, should be contained in a tank with a simple paint or plastic coating which isolates it from the ferricyanide ion. However, since the ion is non-corrosive and benign in contact with many materials, this presents no difficulties. Likewise, the plumbing fixtures used for catholyte management should be similarly protected.

Because of the fact that the majority of the total system comprises liquids contained in tanks (the cell stack is small in comparison), it is possible to design a total system which requires a small area of space. This is acomplished by selecting upright tank designs of small base diameters.

Figure 3:
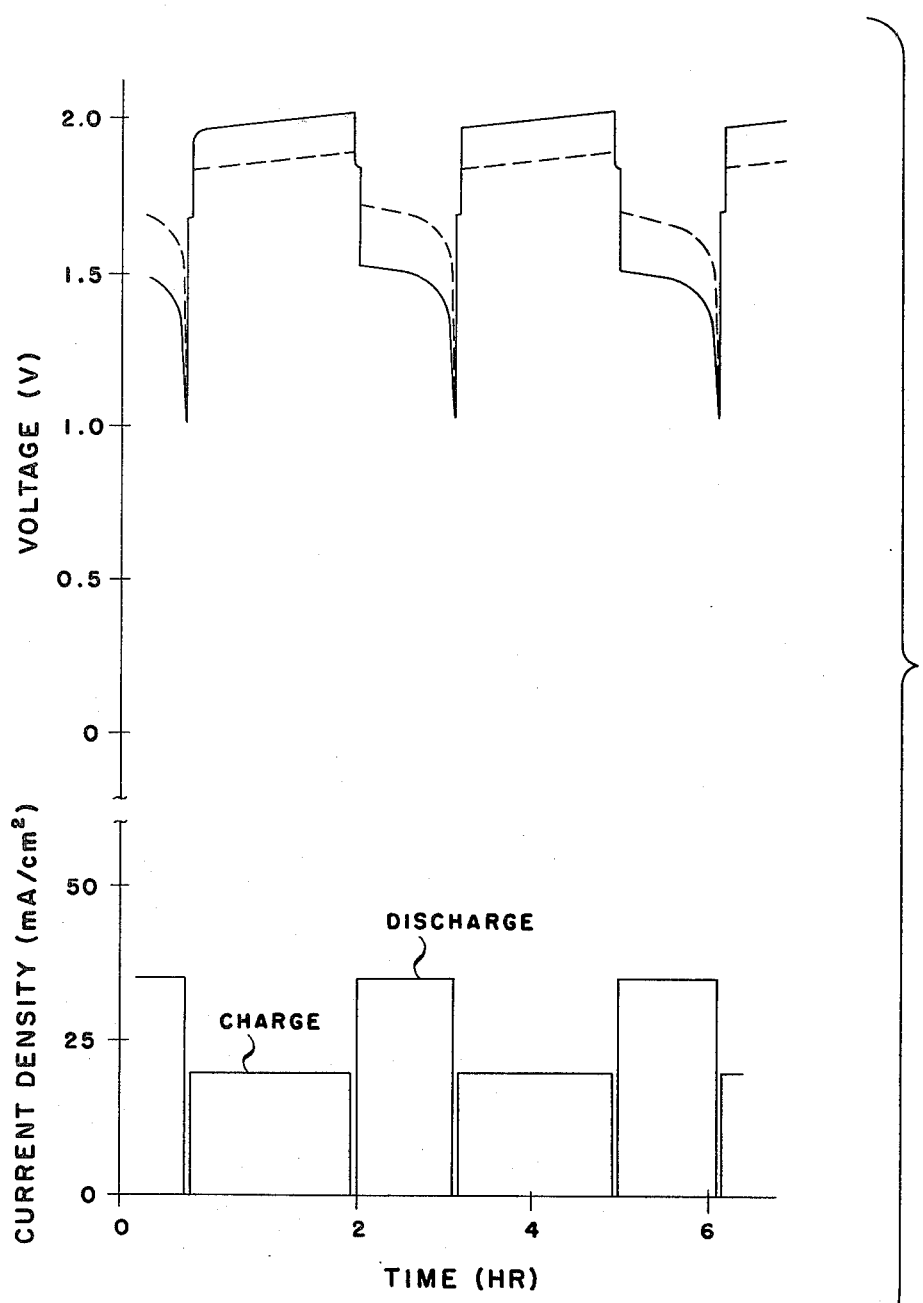
FIG. 3, on coordinates of voltage and current density in milliamperes per cm$^2$ versus time in hours, is a plot depicting illustrative charge-discharge characteristics of a single cell battery of the invention.

FIG. 3, on coordinates of voltage and current density versus time, is a plot depicting typical charge-discharge characteristics of a single cell battery of the invention having an interelectrode spacing of 3.0 cm. The solid lines show actual cell voltages and current densities obtained during charge and discharge modes at 20 mA/cm$^2$ and 35 mA/cm$^2$, respectively, at 38° C. The dotted lines represent calculated charge-discharge curves for the same conditions, using the same separator material (Nafion XR 475) but with an improved cell design limiting interelectrode spacing to 0.5 cm.

From the data of FIG. 3, it is seen that the voltaic efficiencies are about 73 percent; the calculated values average about 88 percent. Coulombic efficiencies average approximately 98 percent to a 250 mV voltage drop on discharge. Energy conversion efficiencies average over 71 percent; with optimal cell design, the energy conversion efficiency is calculated to be 86 percent.

The test cell used to obtain this data was of plexiglas construction with a positive electrode consisting of a thin porous nickel placque with potassium ferro-ferricyanide electrolyte solution circulated either through or by the electrode by means of a plastic-lined piston pump (March Mfg. Co., model 270-1OR). The negative electrode consisted of a flat disk of silver-plated iron, surfaced with silver screen, upon which zinc was electrodeposited from sodium zincate electrolyte during charge and anodically stripped completely during discharge. The zinc electrolyte was circulated with a stainless steel pump (Micropump Corp., model 12A-41-316) past the zinc electrode and back to the reservoir.

Electrolytes were stored separately in polyethylene bottles in a constant temperature bath and circulated through flow meters to the cell through polyethylene tubing, coils of which also serve as heat exchangers. Exposed cross-sectional area of each electrode and the cell separator was 26.1 cm$^2$ with a 3.05 cm interelectrode spacing. The separator was Nafion XR 475, a cathodic exchange membrane, 0.038 cm in thickness. Cell resistance at 35° C. was 0.42Ω. The electrolytes in the discharged states were potassium ferrocyanide-saturated 5 N sodium hydroxide at the positive electrodes and zinc oxide-saturated 5 N sodium hydroxide at the negative electrode.

The test cell was instrumented with two Easterline Angus miniservo model recorders that graphically recorded the cell potential and the potential between the zinc electrode and a $Cd/Cd(OH)_2$ reference electrode. A Doric Digitrend 220 Data Logger recorded all channels of information every 15 minutes and upon demand from an electronic battery cycler. The pertinent tape recorded information operated by the data logger included time, cell current, cell voltage, ampere hours of current passed, potentials of anode and cathode versus the reference electrode and temperature of selected points in the system.

A battery cycler was made up of a combination of electronic digital timers, analog voltage comparators, and constant current drive devices. Assuming a fully discharged battery, the cycle begins with a constant current charge that is controlled by either a set time period or by depletion of ferrocyanide ions resulting in a high voltage cutoff. The data logger is cued to record the data just prior to cessation of charge; the cell is then switched automatically to open circuit. After a minute of open circuit operation, the required data is recorded and a constant current discharge is initiated. The discharge cycle is controlled by depletion of either ferricyanide ion or zinc. To differentiate between the two, if iron depletion occurs first, data is recorded when the cell potential drops by an arbitrarily set value of 500 mV, representing usable coulombic energy. Zinc depletion is sensed by an abrupt potential change of 250 mV between the zinc/silver substrate and a $Cd/Cd(OH)_2$ reference electrode. At this time, data representing total coulombic energy is recorded, and the cycler switches off the discharge current leaving the cell at open circuit. After a minute at open circuit voltage, data is again recorded and the cycle is repeated beginning with a constant current charge. The total charge passed is monitored using an ampere-hour meter with output recorded on the data logger. The cycling system operation is completely automatic with the pertinent data recorded on the recorder strip charts and the data logger tape.

An important embodiment of the invention is the use of an alkaline supporting electrolyte in the battery. This supporting electrolyte is preferably an alkali metal hydroxide, such as lithium, sodium, or potassium hydroxide or their mixtures. Cesium hydroxide could also be used. The lower limit of concentration of the alkali metal hydroxide should not be below about one mole per liter, in order to prevent zinc ferrocyanide from depositing on the anode as an insoluble film causing anode passivation and a drastic decrease in electrical power output. The upper concentration limit of the electrolyte would normally be that which yields optimal electrical conductivity, or about 5 M for sodium hydroxide, 7 M for potassium hydroxide, and 4 M for lithium hydroxide. It is known that conductivity actually decreases in sodium and potassium hydroxide at very high concentrations. Such effect can be readily ascertained. The addition of inert salts to the electrolyte will raise the ionic strength which, in turn, acts to raise the open circuit cell potential by its action on the ferro-ferricyanide ion redox couple. Because of the relatively high charges on the ferrocyanide ion ($-4$) and ferricyanide ion ($-3$), there is a great tendency to form ion pairs with cations of the supporting electrolyte (e.g., $Li^+$, $Na^+$, $K^+$). The ferrocyanide ion, with the larger negative charge, forms these ion pairs more strongly than the ferricyanide ion. As a result, the activity of the reduced species of the redox cycle is lowered to a greater extent than that of the oxidizing species, with increasing ionic strength, so that the open circuit cell potential is thereby increased. This effect is discussed fully in a recent publication; see, L. M. Peter et al., J. Electroanal. Chem., Vol. 71, 1976, pp. 32–50.

Inert salts that can be used as additives to the catholyte are alkali metal chlorides, sulfates, carbonates, borates, sulfamates, perchlorates, and their mixtures. Nitrates and nitrites should not be used since zinc will reduce them to ammonia in alkaline solution. Magnesium, calcium and strontium salts cannot be used since their hydroxides are only sparingly soluble. Barium salts may be used at concentrations below the saturation limit for barium hydroxide. In general, any alkali metal inert salt not oxidized by ferricyanide ion and soluble in an alkali metal hydroxide solution can be used.

The catholyte normally used is composed of a supporting electrolyte of an alkali metal hydroxide of optimal concentration which in normal operation is saturated with alkali metal ferrocyanide and ferricyanide salts at ambient temperature due to the small amount of electrolyte required for circulation through the system. The anolyte normally used is composed of a supporting electrolyte of an alkali metal hydroxide of optimal concentration which also in normal operation is saturated with zinc oxide at the battery operating temperature.

To improve zinc adherence on electrodeposition at the anode, metal additives are used in concentration ranges known to the art, for example, 0.01 to 0.5 g/l. These metals include tin, lead, mercury, tellerium, tungsten, molybdenum, indium, thallium, and selenium. They are added to the anolyte in the form of a soluble salt. The addition of sodium silicate in concentration ranges known to the art, for example, 0.5 to 2 g/l, to the anolyte will improve the quality and grain structure of the zinc electrodeposit over a broad range of current densities; see, H. Creutz, Ger. Offen. No. 2,517,781, Jan. 17, 1974.

The anode substrate is iron. This is plated with silver for efficient electrodeposition of zinc, since the low value of overpotential of hydrogen evolution on iron in alkaline electrolytes precludes its use directly for efficient zinc electrodeposition. Other anode substrates that can be used in the invention are carbon and graphite in various forms, such as smooth plates, porous plates, woven cloth or sponge, copper, copper-plated iron, tin-plated iron, and tin-plated copper. In general, a metallic surface should be selected which is not soluble in the electrolyte and which has a high overvoltage for evolution of hydrogen when electrically charged.

The cathode substrate must not be oxidizable by ferricyanide ion in an alkaline electrolyte. It should have a high surface area for optimal performance. Suitable materials are nickel, carbon, or graphite in plate, porous plate, sponge, screen or woven fabric form. Nickel-plated carbon or graphite in the forms specified above can also be used. Other satisfactory metals for plated carbon or graphite surfaces are silver, gold, platinum, palladium, niobium, tantalum, and cobalt.

The membrane separator to be used in the battery can be of the perfluorinated ion exchange type (e.g., DuPont Nafion 120 or XR 475) or of the teflon-based type (typically RAI Research Corp. P-1010) or of the perfluoro-carboxylic acid type membrane (Asahi Chemical Co.)

The hybrid redox battery of the invention may be operated optimally over the temperature range 20°–50° C. Since the major electrical losses in this battery are due to the resistances of the membrane separator and the electrolyte, operating at elevated temperature is advantageous since cell voltage at a given current density will increase appreciably with temperature. The upper temperature limit is set by the dissolution rate of the electrodeposited zinc on the anode which increases with temperature, thereby decreasing coulombic efficiency. Long-term stability of the alkali metal ferricyanide in the catholyte is also decreased at elevated temperatures.

What is claimed is:

1. An electrically rechargeable battery consisting essentially of at least one inert cathode, at least one zinc anode, a circulating alkaline catholyte in which said cathode is immersed, said catholyte containing a soluble alkali metal ferricyanide salt during electrical charge and a corresponding alkali metal ferrocyanide salt during electrical discharge, and a circulating alkaline anolyte in which said anode is immersed, said catholyte and anolyte permitting, during electrical discharge, electro oxidation of zinc to soluble zincate ions at said anode which are transported by the circulating anolyte to a first storage tank and electro reduction of soluble ferricyanide ions to the corresponding soluble ferrocyanide ions at said cathode which are transported by the circulating catholyte to a second storage tank and, during electrical charge, electrodeposition of zinc metal on said anode and electro oxidation of soluble ferrocyanide salt to the corresponding ferricyanide salt at said cathode.

2. A battery in accordance with claim 1 wherein means are provided for causing zinc oxide to precipitate out of said anolyte in said first storage tank and alkali metal ferrocyanide salt to precipitate out of said catholyte in said second storage tank.

3. A battery in accordance with claim 2 wherein during electrical charge of said battery solid zinc oxide in said first storage tank is dissolved in said circulating anolyte as soluble zincate ions and transported to said anode and solid alkali metal ferrocyanide salt in said second storage tank is dissolved in said circulating catholyte and transported to said cathode.

4. A battery in accordance with claim 1 wherein said anode and cathode comprise a plurality of bipolar electrodes connected in series internally.

5. A battery in accordance with claim 1 wherein a separator is utilized between said anode and said cathode.

6. A battery in accordance with claim 5 wherein said separator is an ion exchange separator.

7. A battery in accordance with claim 1 wherein said alkali metal ferro-ferricyanide salt is selected from the group consisting of lithium, sodium, and potassium.

8. A battery in accordance with claim 1 wherein said alkaline catholyte and alkaline anolyte is an alkali metal hydroxide.

9. A battery in accordance with claim 8 wherein said alkali metal is selected from the group consisting of lithium, sodium, and potassium.

10. A battery in accordance with claim 8 wherein the open circuit cell potential of said battery is increased by the addition of inert alkali metal salts to said catholyte, said salts being non-oxidizable by said ferricyanide ion and soluble in said alkali metal hydroxide catholyte.

11. A battery in accordance with claim 8 wherein said anode comprises metallic zinc electrodeposited on a substrate having a high overvoltage for evolution of hydrogen when electrically charged.

* * * * *